United States Patent
Ren et al.

(10) Patent No.: US 12,219,584 B2
(45) Date of Patent: Feb. 4, 2025

(54) SYSTEM AND METHOD FOR RESOURCE ALLOCATION

(71) Applicant: ZTE CORPORATION, Guangdong (CN)

(72) Inventors: Min Ren, Shenzhen (CN); Peng Hao, Shenzhen (CN); Xianghui Han, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 335 days.

(21) Appl. No.: 17/876,614

(22) Filed: Jul. 29, 2022

(65) Prior Publication Data

US 2022/0369307 A1 Nov. 17, 2022

Related U.S. Application Data

(63) Continuation of application No. PCT/CN2020/106931, filed on Aug. 5, 2020.

(51) Int. Cl.
*H04W 4/00* (2018.01)
*H04W 72/0446* (2023.01)
*H04W 72/51* (2023.01)

(52) U.S. Cl.
CPC ....... *H04W 72/51* (2023.01); *H04W 72/0446* (2013.01)

(58) Field of Classification Search
CPC .. H04W 72/51; H04W 72/0446; H04W 72/23
See application file for complete search history.

(56) References Cited

U.S. PATENT DOCUMENTS

| 2019/0149365 A1* | 5/2019 | Chatterjee | H04L 25/0226 370/329 |
| 2021/0136830 A1* | 5/2021 | Lin | H04W 72/23 |

(Continued)

FOREIGN PATENT DOCUMENTS

| CN | 103096439 A | 5/2013 | |
| EP | 4322679 A1 * | 2/2024 | ............... H04L 1/00 |
| WO | WO-2020/063408 A1 | 4/2020 | |
| WO | WO-2020/065617 A1 | 4/2020 | |

(Continued)

OTHER PUBLICATIONS

3GPP: "Physical layer procedures for control" Technical Specification Group Radio Access Network; NR; (Release 16) 3GPP Ts 38.213 V16.1.0; Sophia Antipolis, Valbonne, France; Mar. 31, 2020 (156 pages).

(Continued)

*Primary Examiner* — Thai Dinh Hoang
(74) *Attorney, Agent, or Firm* — Foley & Lardner LLP

(57) ABSTRACT

Presented are systems and methods for resource allocation. A wireless communication device may receive information from a wireless communication node, the information comprising a location of a starting symbol (S) and a time domain duration (L) of a first transmission occasion for a set of one or more transmissions, a number of consecutive slots, and a number (N) of transmission occasions in a time slot, each transmission occasion defining a time window for one of the one or more transmissions. The wireless communication device may determine a location of a last transmission occasion of the set. The wireless communication device may perform the set of one or more transmissions across the number of consecutive time slots according to the information and the location of the last transmission occasion.

16 Claims, 8 Drawing Sheets

(56) References Cited

U.S. PATENT DOCUMENTS

| | | | |
|---|---|---|---|
| 2021/0184812 A1* | 6/2021 | MolavianJazi | H04L 1/0041 |
| 2021/0400714 A1* | 12/2021 | Huang | H04W 72/23 |
| 2023/0015168 A1* | 1/2023 | Ye | H04L 1/0009 |
| 2023/0028259 A1* | 1/2023 | Jang | H04L 1/08 |
| 2023/0209514 A1* | 6/2023 | Cozzo | H04L 5/0073 370/336 |
| 2023/0209527 A1* | 6/2023 | Jang | H04B 7/0695 370/330 |
| 2023/0224837 A1* | 7/2023 | Choi | H04W 72/1268 |
| 2023/0261789 A1* | 8/2023 | Lei | H04W 74/08 370/329 |
| 2023/0354163 A1* | 11/2023 | Yi | H04W 48/12 |
| 2024/0032024 A1* | 1/2024 | Dai | H04L 1/08 |
| 2024/0073923 A1* | 2/2024 | Lim | H04L 5/0051 |
| 2024/0080818 A1* | 3/2024 | Wang | H04L 5/0012 |
| 2024/0244521 A1* | 7/2024 | Yi | H04W 52/0206 |
| 2024/0283612 A1* | 8/2024 | Cozzo | H04L 5/0053 |

FOREIGN PATENT DOCUMENTS

| | | | | |
|---|---|---|---|---|
| WO | WO-2022027263 A1 | * | 2/2022 | H04W 72/0446 |
| WO | WO-2024094364 A1 | * | 5/2024 | H04L 5/0033 |
| WO | WO-2024094367 A1 | * | 5/2024 | H04L 27/2613 |

OTHER PUBLICATIONS

International Search Report and Written Opinion for PCT Appl. No. PCT/CN2020/106931, mailed Apr. 26, 2021 (12 pages).

3rd Generation Partnership Project; Technical Specification Group Radio Access Network; NR; Physical layer procedures for data (Release 16), 3GPP TS 38.214 V16.1.0 (Mar. 2020), 151 pages.

First Office Action for CN Appl. No. 202080093824.1, dated Jun. 28, 2024 (with English translation, 15 pages).

LG Electronics, "Remaining issues on UL data transmission procedure", 3GPP TSG RAN WG1 Meeting #92, R1-1802215, Mar. 2, 2018, Athens, Greece (13 pages).

* cited by examiner

| Index | PUSCH mapping type | K2 | S | L | Repetition number |
|---|---|---|---|---|---|
| 1 | TypeB | 0 | 4 | 4 | 2 |
| 2 | TypeB | 1 | 0 | 7 | 1 |
| 3 | TypeB | 1 | 0 | 7 | 2 |
| ... | ... | ... | ... | ... | ... |

# SYSTEM AND METHOD FOR RESOURCE ALLOCATION

CROSS-REFERENCE TO RELATED APPLICATION

This application claims the benefit of priority under 35 U.S.C. § 120 as a continuation of PCT Patent Application No. PCT/CN2020/106931, filed on Aug. 5, 2020, the disclosure of which is incorporated herein by reference in its entirety.

TECHNICAL FIELD

The disclosure relates generally to wireless communications, including but not limited to systems and methods for resource allocation.

BACKGROUND

The standardization organization Third Generation Partnership Project (3GPP) is currently in the process of specifying a new radio interface called 5G new radio (5G NR) as well as a next generation packet core network (NG-CN or NGC). The 5G NR will have three main components: a 5G access network (5G-AN), a 5G core network (5GC), and a user equipment (UE). In order to facilitate the enablement of different data services and requirements, the elements of the 5GC, also called network functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive information from a wireless communication node, the information comprising a location of a starting symbol (S) and a time domain duration (L) of a first transmission occasion for a set of one or more transmissions, a number of consecutive slots, and a number (N) of transmission occasions in a time slot, each transmission occasion defining a time window for one of the one or more transmissions. The wireless communication device may determine a location of a last transmission occasion of the set. The wireless communication device may perform the set of one or more transmissions across the number of consecutive time slots according to the information and the location of the last transmission occasion.

In some embodiments, a plurality of transmission occasions may be configured for the set of one or more transmissions. In some embodiments, the plurality of transmission occasions may occur back-to-back within a period of time without any time gap between consecutive ones of the plurality of transmission occasions. In some embodiments, determining the location of the last transmission occasion may comprise determining a location of an end symbol of the last transmission occasion according to: $S+L*N-1$. The last transmission occasion may be located in a last slot of the number of consecutive slots. In some embodiments, the last transmission occasion may occupy a time duration that is shorter than or equal to that of each of other ones of the transmissions.

At least one aspect is directed to a system, method, apparatus, or a computer-readable medium. A wireless communication device may receive, from a wireless communication node, an indication that a first transmission of one or more transmissions cannot occur in a last or P-th transmission occasion for the one or more transmissions, when at least one of: a repetition number for the one or more transmissions is greater than or equal to a first threshold, or a number of resource configurations is greater than or equal to a second threshold. P may be an integer greater than or equal to 1. Each transmission occasion may define a time window for one of the one or more transmissions.

At least one aspect is directed to a system, method, apparatus, or a computer-readable medium. A wireless communication device may determine that a first transmission of one or more transmissions cannot occur in a last or P-th transmission occasion for the one or more transmissions, when at least one of: a repetition number for the one or more transmissions is greater than or equal to a first threshold, or a number of resource configurations is greater than or equal to a second threshold. P may be an integer greater than or equal to 1. Each transmission occasion may define a time window for one of the one or more transmissions.

In some embodiments, the wireless communication device may receive the repetition number from the wireless communication node. In some embodiments, at least one of the first threshold or the second threshold may have a value of an integer greater than or equal to 1. In some embodiments, the wireless communication device may receive the indication from the wireless communication node via radio resource control (RRC) signaling or downlink control information (DCI) signaling.

At least one aspect is directed to a system, method, apparatus, or a computer-readable medium. A wireless communication node may send information to a wireless communication device, the information comprising a location of a starting symbol (S) and a time domain duration (L) of a first transmission occasion for a set of one or more transmissions, a number of consecutive slots, and a number (N) of transmission occasions in a time slot. Each transmission occasion may define a time window for one of the one or more transmissions. The wireless communication device may determine a location of a last transmission occasion of the set. The wireless communication device may perform the set of one or more transmissions across the number of consecutive time slots according to the information and the location of the last transmission occasion.

In some embodiments, a plurality of transmission occasions may be configured for the set of one or more transmissions. In some embodiments, the plurality of transmission occasions may occur back-to-back within a period of time without any time gap between consecutive ones of the plurality of transmission occasions. In some embodiments, determining the location of the last transmission occasion may comprise determining a location of an end symbol of the last transmission occasion according to: $S+L*N-1$. The last transmission occasion may be located in a last slot of the number of consecutive slots. In some embodiments, the last transmission occasion may occupy a time duration that is shorter than or equal to that of each of other ones of the transmissions.

At least one aspect is directed to a system, method, apparatus, or a computer-readable medium. A wireless communication node may send to a wireless communication device, an indication that a first transmission of one or more transmissions cannot occur in a last or P-th transmission occasion for the one or more transmissions, when at least one of: a repetition number for the one or more transmissions is greater than or equal to a first threshold, or a number of resource configurations is greater than or equal to a second threshold. P may be an integer greater than or equal to 1. Each transmission occasion may define a time window for one of the one or more transmissions.

At least one aspect is directed to a system, method, apparatus, or a computer-readable medium. A wireless communication device may determine that a first transmission of one or more transmissions cannot occur in a last or P-th transmission occasion for the one or more transmissions, when at least one of: a repetition number for the one or more transmissions is greater than or equal to a first threshold, or a number of resource configurations is greater than or equal to a second threshold. P may be an integer greater than or equal to 1. Each transmission occasion defines a time window for one of the one or more transmissions.

In some embodiments, the wireless communication node may send the repetition number to the wireless communication device. In some embodiments, at least one of the first threshold or the second threshold may have a value of an integer greater than or equal to 1. In some embodiments, the wireless communication node may send the indication to the wireless communication device via radio resource control (RRC) signaling or downlink control information (DCI) signaling.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5 illustrates a table for time domain resource assignment, in accordance with some embodiments of the present disclosure;

DETAILED DESCRIPTION

Figure 1:
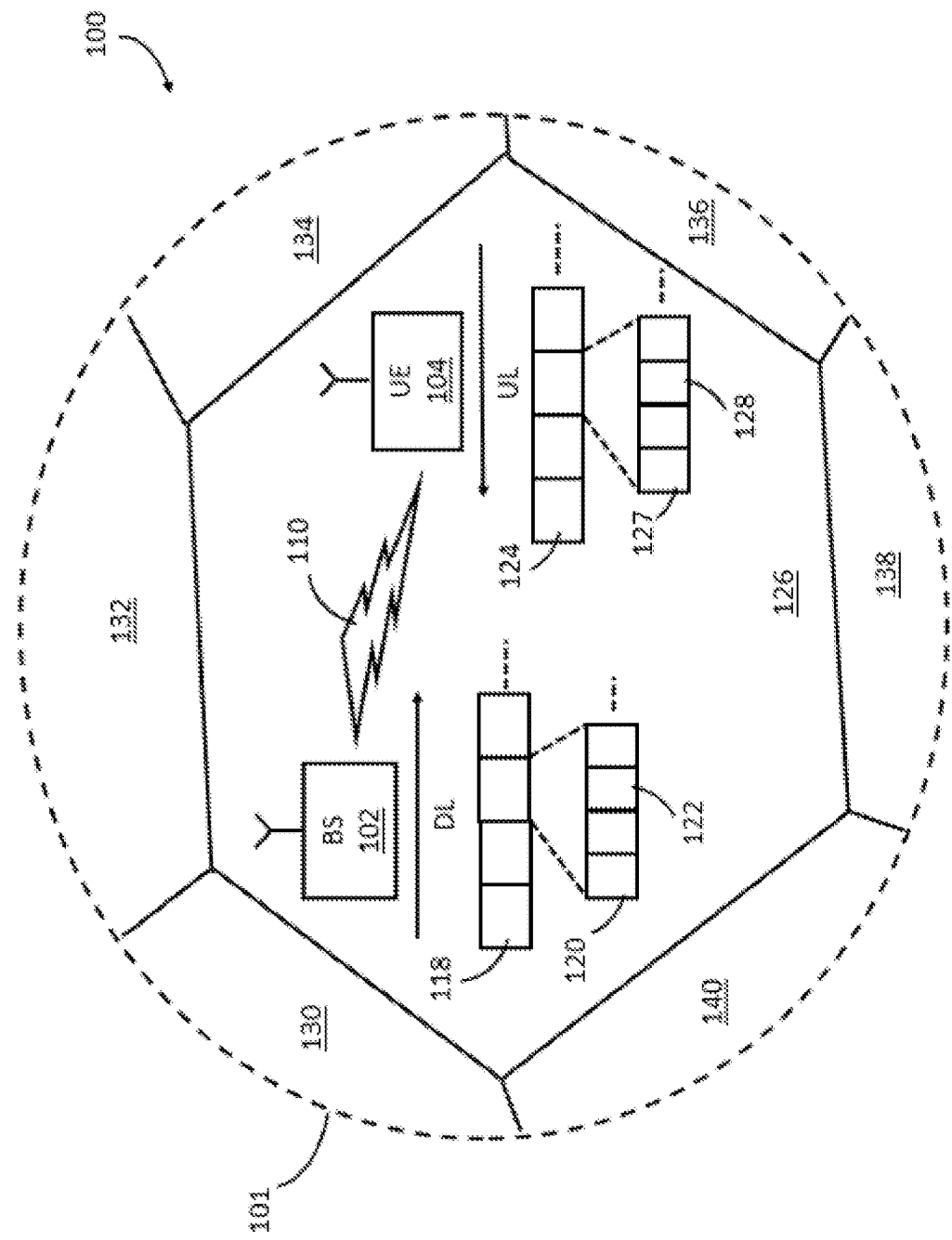
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |

-continued

| Acronym | Full Name |
| --- | --- |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
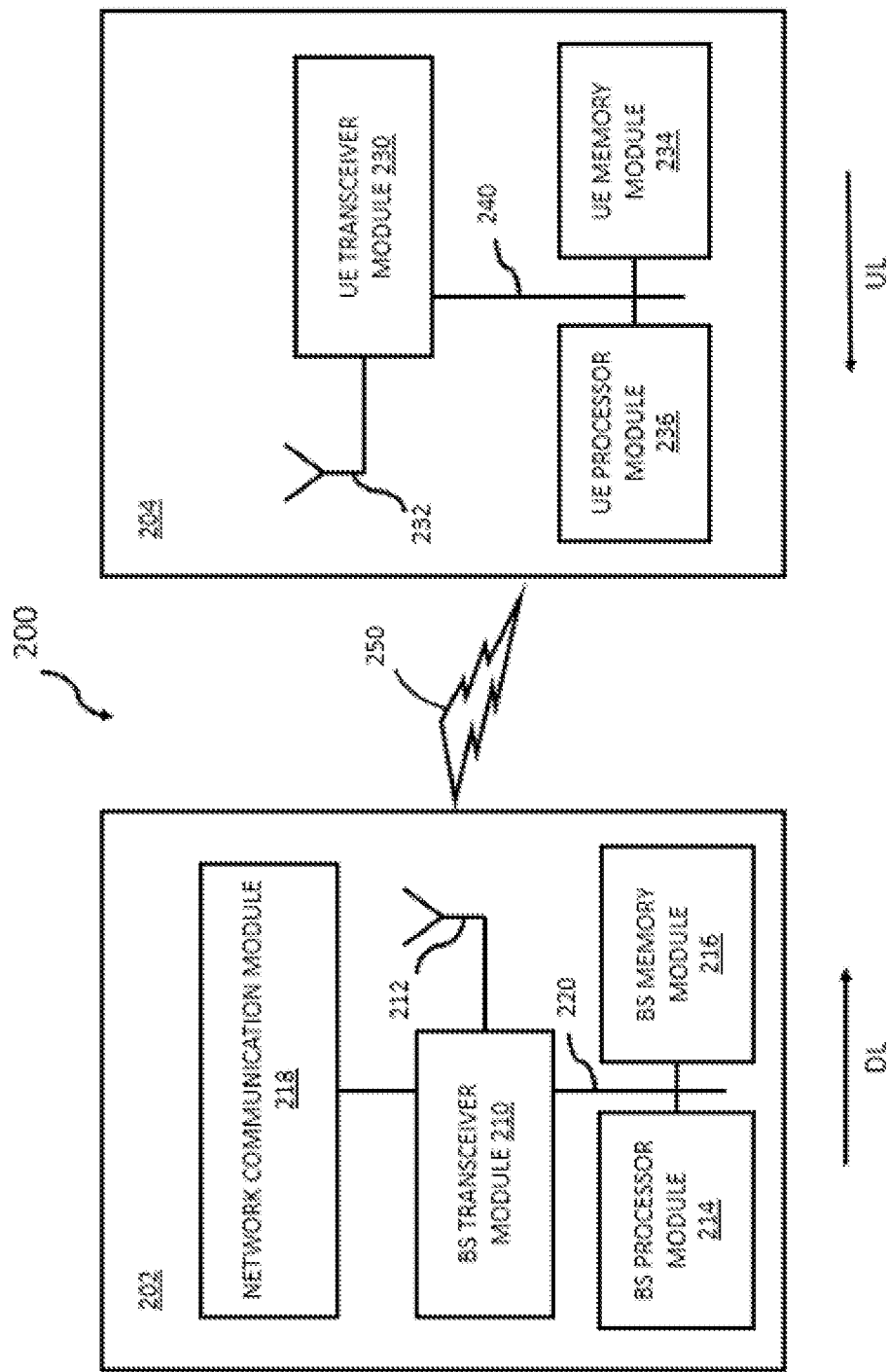
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Resource Allocation

Certain systems (e.g., new radio-unlicensed (NR-U) systems) applying ultra-reliable low-latency communication (URLLC) services may ensure/verify/quantify the reliability of URLLC transmissions under limited free channel resources (e.g., bandwidth and/or other resources). In some embodiments, URLLC transmissions encountering non-transportable symbols may ensure/verify the reliability of URLLC transmissions.

In some embodiments, certain systems may face a plurality of problems/difficulties when using unlicensed carrier operation(s) (e.g., new radio-unlicensed (NR-U)). For example, some countries and/or regions may have/enforce corresponding regulatory policies for using unlicensed spectrum. Therefore, a wireless communication device (e.g., a UE, a terminal, or a served node) may perform listen before talk (LBT), also known as clear channel assessment (CCA), prior to sending/transmitting/broadcasting data (or other information) using unlicensed carriers. An exception to performing LBT for this is if the wireless communication device is already accessing the channel. A wireless communication device that successfully performs CCA may send/transmit/broadcast data (or other information) using the unlicensed carrier(s).

One or more types of equipment and/or devices may access the unauthorized technology long term evolution (LTE) assisted access (also referred to as LAA) uplink using at least two standard CCA mechanisms. An example standard CCA mechanism may comprise a type 1 CCA mechanism with random fallback (e.g., different channel access levels (p1~p4)). Another example standard CCAA mechanism may comprise a type 2 CCA mechanism without random fallback (e.g., perform LBT for a predefined period of time). The wireless communication device may transmit/send data and/or information using a similar channel access process. The transmissions of the wireless communication device may comprise base station-based scheduling, autonomous uplink transmissions (e.g., scheduling-free transmission, and/or configured grant), hybrid automatic repeat request acknowledgement (HARQ-ACK) feedback on downlink transmission data, and/or other transmissions.

Figure 3:
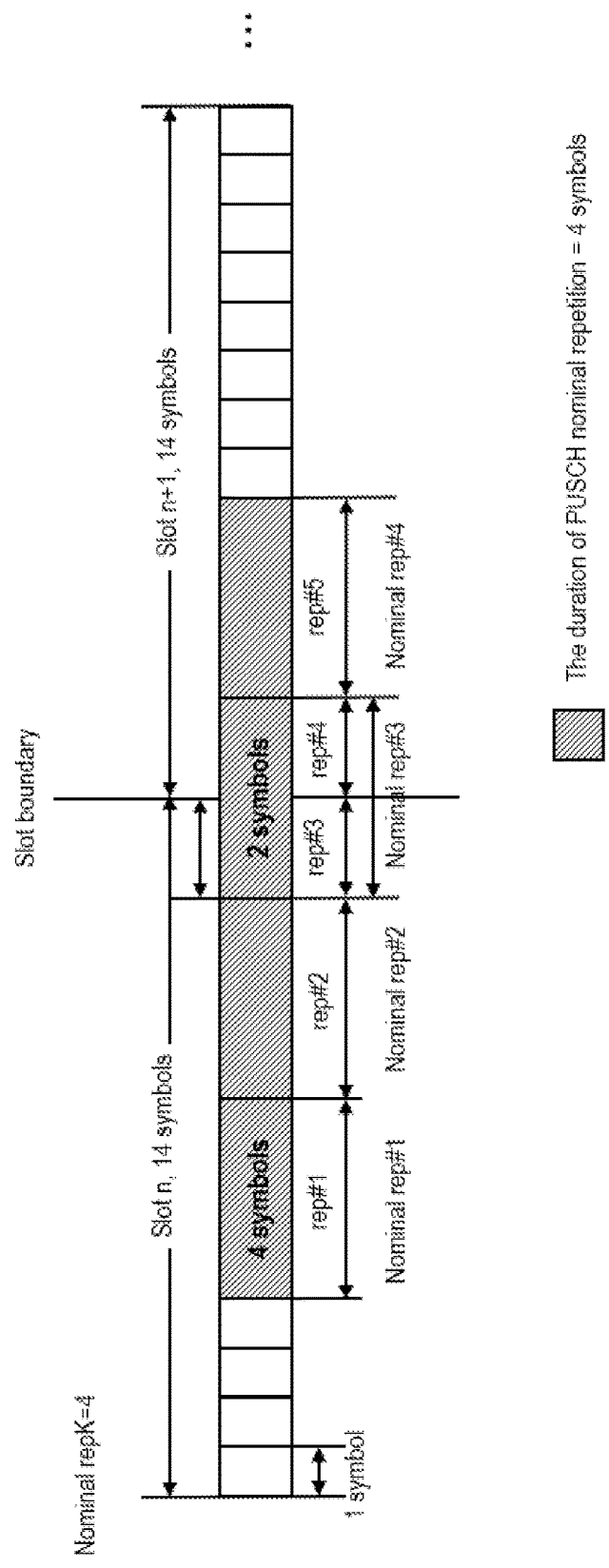
FIG. 3 illustrates a block diagram of resource assignments for repeat transmissions, in accordance with some embodiments of the present disclosure.

Referring now to FIG. 3, depicted is a block diagram 300 of resource assignments for repeat transmissions, in accordance with some embodiments of the present disclosure. In certain authorized/licensed carriers, repetition-free repeat transmissions (e.g., repetition for uplink transmission with a configured grant) may be used to ensure coverage and/or short-time transmission of low-latency and high-reliability services (e.g., aggregation for uplink transmission by a DCI or other grant). The repetition of the transmission methods may result in one or more repeat transmissions of a same transport block (TB), physical uplink shared channel (PUSCH), and/or other transmissions (e.g., nominal rep #1, nominal rep #2, nominal rep #3, nominal rep #4, and/or other transmissions). The wireless communication device may send/transmit repeat transmissions of the same TB and/or PUSCH once in the same time slot, more than once in the same time slot, and/or when more than one transmission is available in a row. In some embodiments, the same TB and/or PUSCH transmission may comprise a repeat transmission across the slot boundary of the slot. For example, the wireless communication device may transmit/send a repeat transmission of the same TB (e.g., nominal rep #3 or other transmissions) across the slot boundary between slot n and slot n+1.

A wireless communication node (e.g., a ground terminal, a base station, a gNB, an eNB, or a serving node) may send/transmit (or provide access to, or send/transmit information about) a time domain resource assignment (TDRA) table to the wireless communication device. The wireless communication node may use the TDRA table to notify/inform/indicate/specify the first repeated start symbol, the duration of the time domain, the number of repeated transmissions, and/or other information to the wireless communication device. On the transmissible symbols, each repetition may comprise a back-to-back, continuous transmission. For example, nominal rep #1, nominal rep #2, nominal rep #3, and nominal rep #4 may include transmissible symbols. Each repetition (e.g., nominal rep #1, nominal rep #2, and/or other repetitions) may comprise a back-to-back, continuous transmission, e.g., without any transmission/time gaps between adjacent/consecutive repetitions.

Figure 4:
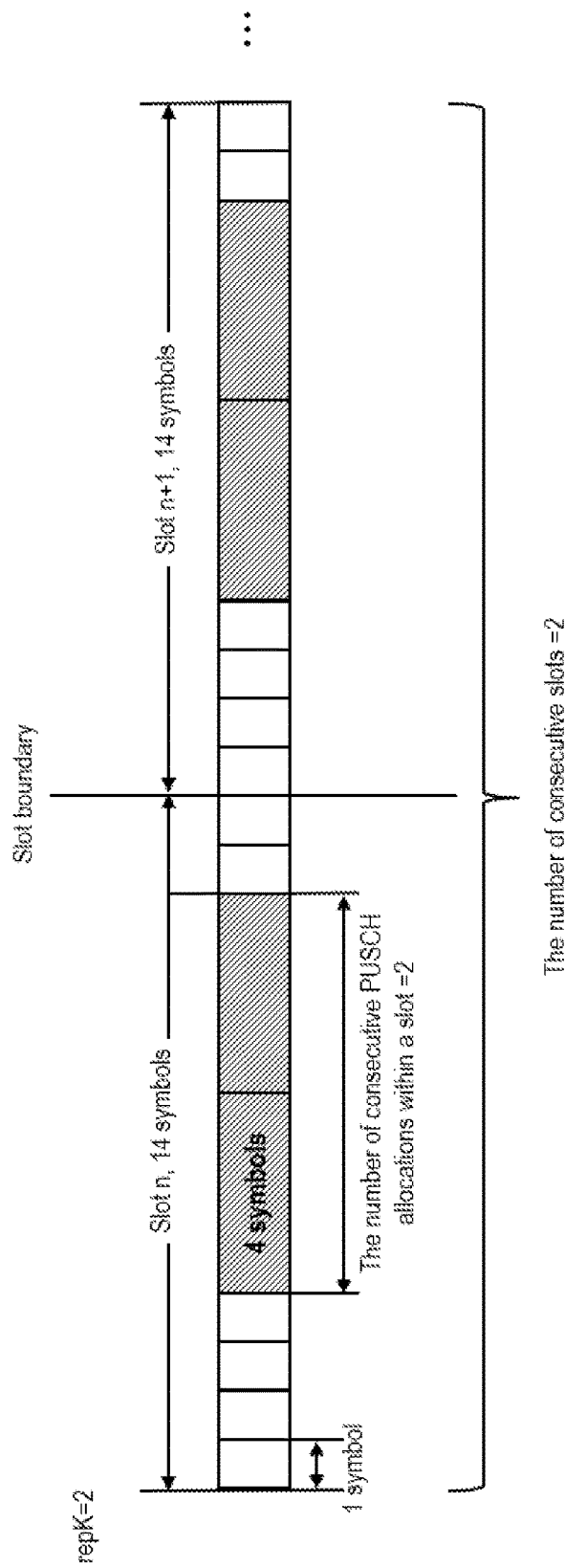
FIG. 4 illustrates a block diagram of resource assignments for repeat transmissions, in accordance with some embodiments of the present disclosure.

Referring now to FIG. 4, depicted is a block diagram 400 of resource assignments for repeat transmissions, in accordance with some embodiments of the present disclosure. In some embodiments, certain unlicensed carriers may use/enable scheduling-free repeat transmissions (e.g., repetition for uplink transmissions using a configured grant). By using scheduling-free repeat transmissions, the wireless communication device may send/transmit one or more repeat transmissions of the TB, PUSCH, and/or other transmissions once in the same time slot and/or more than once in the same time slot. For example, the wireless communication device may send/transmit one or more PUSCH repetitions more than once in the same time slot (e.g., time slot n, time slot n+1, and/or other time slots). The one or more TB and/or PUSCH repetitions may be available or scheduled continuously. For example, two (or other numbers) consecutive PUSCH allocations may be available within a time slot (e.g., time slot n or time slot n+1). The one or more TB and/or PUSCH repetitions may comprise four (or other numbers) symbols.

In some embodiments, the wireless communication device may send/transmit the one or more repeat TB and/or PUSCH transmissions in the same time slot, without crossing one or more timeslot boundaries. For example, the wireless communication device may send one or more TB repetitions in time slot n+1, without crossing the slot boundary. The wireless communication node may use high level signaling (e.g., radio resource control (RRC) signaling, repK signaling, and/or other types of signaling) to notify the number of time slots and/or the number of repetitions in one or more time slots. For example, the high-level signaling repK may notify/inform/specify/indicate that the number of repetitions in one or more time slots is two (or other numbers). The number of repetitions in one or more time slots may comprise back-to-back continuous transmissions. The wireless communication node may use the TDRA table to notify/inform/indicate/specify the start symbol, the time domain duration of the first repeated transmission in a time slot, and/or other information. The first repetition of each time slot transmission may have the same start symbol and/or duration in the time domain.

Referring now to FIG. 5, depicted is a table 500 for time domain resource assignment, in accordance with some embodiments of the present disclosure. In some embodiments, one or more transmissions may cross/traverse (or extend over) a time slot boundary to ensure high reliability and low delay. The time domain location of the resource allocation may be determined using one or more of the following methods. The wireless communication device may receive/obtain the TDRA table (or information thereof) from the wireless communication node, or may have access to the TDRA table or its information. The TDRA table may include/provide/specify an index, a PUSCH mapping type, a slot offset K2 (e.g., from the time slot of the PDCCH carrying the DCI scheduling the PUSCH to the time slot of the transmitted PUSCH), a starting position S, a time domain duration L, a repetition number, and/or other information. A number of repetitive transmissions (specified/configured according to a repetition number) may initiate/begin at the position where LBT is successful. The wireless communication device may determine/configure the time resource location according to the number of received slots M, the number of mini slots within a slot X, the TDRA table, and/or other information. The value of M is an integer of 1 or more. The number of mini slots within a slot X may comprise the number of PUSCH allocations (or candidate transmission occasions) in a slot X. For example, the number of mini slots within slot #1 may correspond to two nominal mini slots with time duration equal to L. The wireless communication device may use the information of the TDRA table to determine the starting symbol or starting location (S) of the first transmissions, the time domain duration (L) of the first transmission, and/or other information. Although certain portions of this disclosure may refer to transmissions or their locations within time slots, these can sometimes refer to candidate transmission occasions (or time windows for potential transmissions), each of which may or may not be occupied by an actual transmission (e.g., depending on LBT results).

The wireless communication device may determine/configure the end symbol of the last transmission (or other transmissions) using the information of the TDRA table. The wireless communication device may determine the end symbol using the number of mini slots (N), the number of time slots (M), and/or other information. The wireless communication node may provide/indicate/specify the number of time slots (M) and/or the number of mini slots (N). The time slot of the end position of the last transmission may correspond to the M slot. The position of the end symbol of the last transmission may be determined/configured using the following equation:

$$\text{end position} = S + L \times N - 1$$

The time-domain resources of the remaining transmissions (e.g., the transmissions between the first transmission and the last transmission) may correspond to back-to-back continuous transmissions, without time/transmission gap between any two adjacent/consecutive transmissions. The remaining transmissions have the same time domain duration, time domain continuous length, and/or mapping type. For example, the first nominal PUSCH allocation follows the TDRA, and the remaining nominal PUSCH allocations have the same length and the PUSCH mapping type. The remaining nominal PUSCH allocations may be appended following the previous allocation without gaps. In some embodiments, the time domain duration of the first transmission may correspond to the value of L of the TDRA table. The time domain duration of the remaining transmissions, except the last transmission, may correspond to the value of L of the TDRA table.

Figure 6:
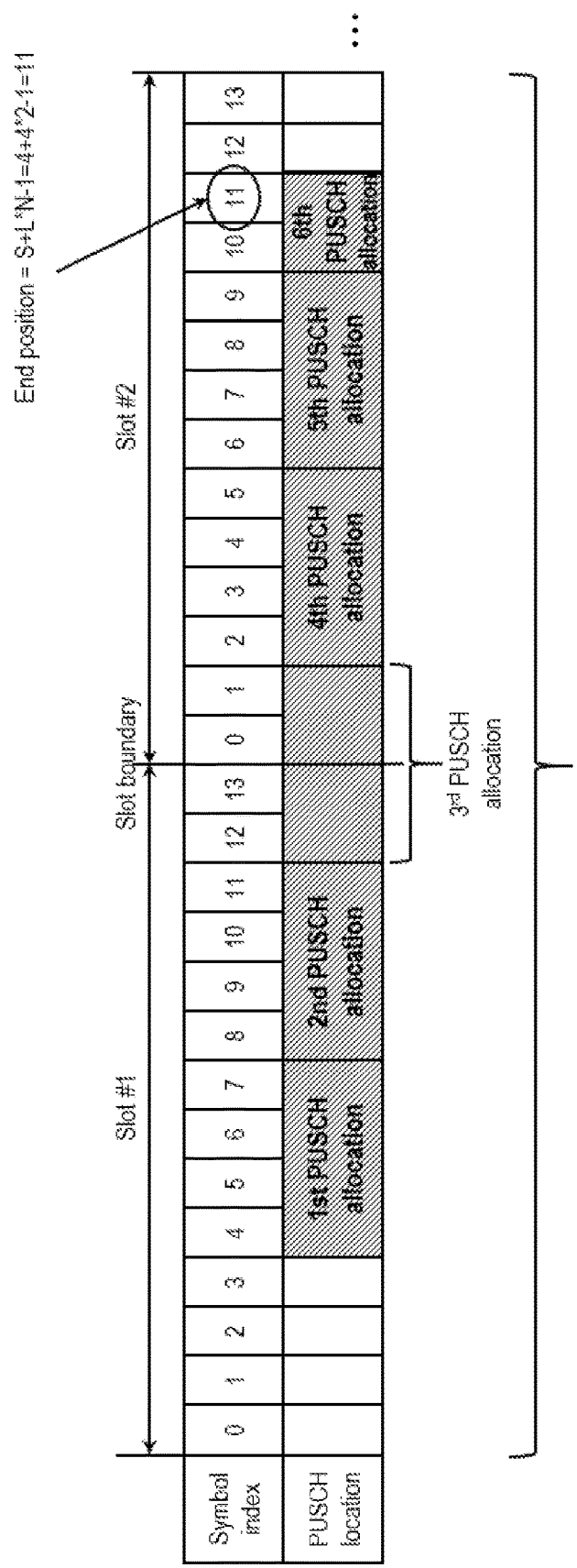
FIG. 6 illustrates a block diagram of time domain resource assignments for repeat transmissions, in accordance with some embodiments of the present disclosure.

Referring now to FIG. 6, depicted is a block diagram 600 of resource assignments for repeat transmissions, in accordance with some embodiments of the present disclosure. The index line of the TDRA table may specify/indicate/provide the PUSCH mapping type, the K2, the starting position (S) of the corresponding transmission, the time duration (L) of the corresponding transmission, and/or the repetition number. For example, if the index line has a value of one (e.g., index=1), the first transmission may have a starting position (S) equal to four (e.g., S=4) and a time domain duration (L) equal to four (e.g., L=4). Therefore, the starting symbol of the first transmission may correspond to symbol 4 and the starting slot of the first transmission may correspond to slot #1. The end symbol of the first transmission may correspond to symbol 7, while the end slot of the first transmission may correspond to slot #1.

In the same example, the number of mini slots N in the time slot X may correspond to two nominal mini-slots (e.g., N=2). For example, slot #1 (or other slots) may comprise two nominal mini slots. Therefore, the end symbol of the last transmissions may correspond to S+L×N−1=4+4×2−1=11 (e.g., end symbol may correspond to symbol 11). The number of time slots (M) may correspond to a value of two (e.g., slot #1 and slot #2). Therefore, the time slot of the last transmission may correspond to the second time slot (e.g., slot #2). With the exception of the first and the last transmissions, the time domain positions of the remaining transmissions are continuous, without gaps or intervals to temporally separate adjacent/consecutive transmissions. The time domain length of each of the remaining transmissions may correspond to the time domain length of the first transmission.

In certain licensed carriers, if the redundancy version (RV) sequence corresponds to {0, 0, 0, 0}, the first transmission of the configured grant PUSCH may start/initiate at one or more time domain locations. For example, any one of six (or other numbers) or more locations may result in a successful LBT procedure, leading to an actual repetitive transmission. If the repetition number (e.g., for indicating the number of repetitive transmissions) provided/indicated by the wireless communication node is greater than or equal to 8 (or other numbers), the first transmission may begin/initiate at a time domain location (occasion) that is different from the time domain location of the last PUSCH.

In certain unlicensed carriers, the LBT detection may indicate that it is idle (e.g., successful or clear) at the resource location of the last PUSCH. If the LBT detection indicates that the resource location of the last PUSCH is idle, the first transmission may begin/initiate at a resource location that is different from the resource location of the last PUSCH. For example, the first transmission may begin/initiate on another resource configuration.

The wireless communication device may determine the first transmission of the PUSCH using at least one of the following methods. In some embodiments, the initial transmission of a transport block may begin in an occasion that is different from the P-th transmission occasion. The P-th transmission occasion may correspond to the last transmission occurrence or other transmission occurrences. In some embodiments, P may correspond to an integer greater than or equal to 1. The wireless communication node may indicate/specify/provide the repetition number. In some embodiments, the repetition number may be greater than or equal to a first threshold. The value of the first threshold may correspond to an integer greater than or equal to 1. In some embodiments, the number of resource configurations may be greater than or equal to a second threshold. The value of the second threshold may correspond to an integer greater than or equal to 1. If the repetition number and/or the number of configurations satisfy/meet or exceed the corresponding thresholds, the wireless communication node may indicate/specify that the PUSCH (or other transmissions) may not start the first transmission at a certain time domain position. The certain time domain position may correspond to the time domain position of the P-th transmission (or the last transmission). The wireless communication node may provide the indication via RRC signaling, downlink control information (DCI) signaling, and/or other types of signaling. In some embodiments, certain specifications predefine that the PUSCH may begin/initiate the first transmission at a time domain position that is different from the time domain position of the P-th transmission occasion.

In some embodiments, the wireless communication node may use RRC signaling or DCI signaling to send/transmit an indication. The indication may specify that the PUSCH transmission may begin the first transmission at a time domain that is different from the time domain of the P-th transmission (or the last transmission). If the repetition number is greater than or equal to the first threshold and/or the number of resource configurations is greater than or equal to the second threshold, the wireless communication device may determine an occurrence or time domain location of the first transmission. For example, the wireless communication device may determine to initiate the first transmission of the PUSCH at a time domain location that is different from the time domain location of the P-th transmission occasion.

In some embodiments, the PUSCH may initiate the first transmission at a time domain position that is different from the time domain position of the P-th transmission occasion. If the repetition number is greater than or equal to the first threshold and/or the number of resource configurations is greater than or equal to the second threshold, the wireless communication device may determine a condition of the first transmission. For example, the wireless communication device may determine to initiate the first transmission of the PUSCH at a time domain location that is different from the time domain location of the P-th transmission occasion.

A. Methods for Resource Allocation

Figure 7:
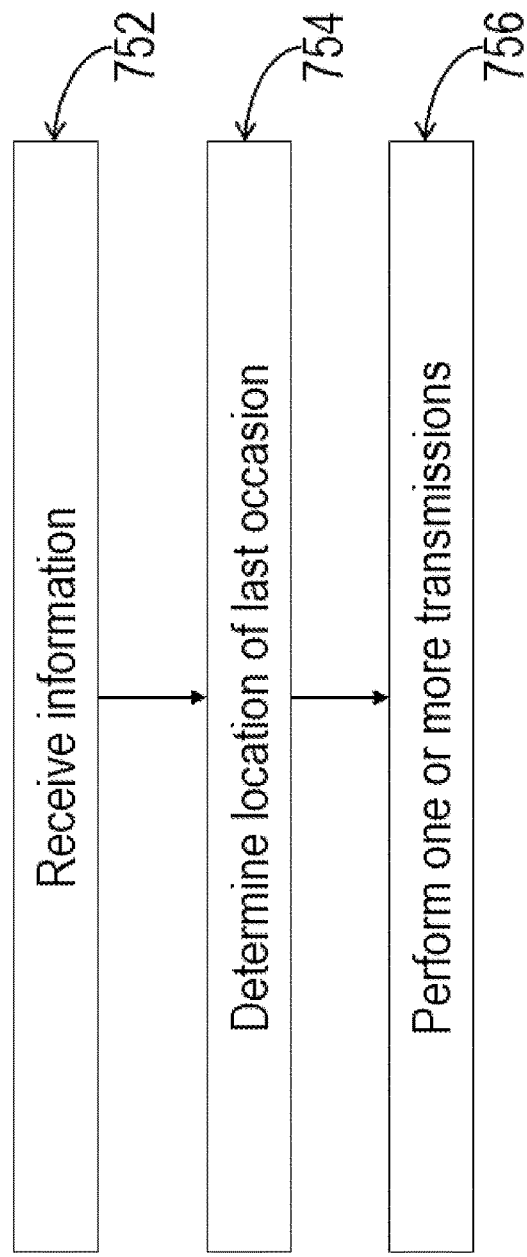
FIGS. 7-8 illustrate various flow diagrams of example methods for determining resource assignments, in accordance with some embodiments of the present disclosure.

FIG. 7 illustrates a flow diagram of a method 700 for determining resource assignments. The method 700 may be implemented using any of the components and devices detailed herein in conjunction with FIGS. 1-6. In overview, the method 700 may include receiving information (752). The method 700 may include determining the location of the last occasion (754). The method 700 may include performing one or more transmissions (756).

Referring now to operation (752), and in some embodiments, a wireless communication device may receive/obtain information from a wireless communication node. The wireless communication node may send/transmit the information to the wireless communication device. The information may comprise/include/specify/provide a location of a starting symbol (S) and/or a time domain duration (L) of a first transmission occasion for a set of one or more transmissions (e.g., PUSCH, TB, or other transmissions). The information may comprise a number of consecutive slots, a number (N) of transmission occasions in a time slot, and/or other information. In some embodiments, each transmission occasion may define/correspond to a time window for one of the one or more transmissions. In some embodiments, a plurality of transmission occasions may be configured for the set of one or more transmissions. The plurality of transmission occasions may occur back-to-back within a period of time. The plurality of transmissions occasions may occur without any time gap between consecutive ones of the plurality of transmissions occasions. The plurality of transmissions occasions may have a same/corresponding time domain duration or time domain length.

Referring now to operation (754), and in some embodiments, the wireless communication device may determine a location of a last transmission occasion (or a location of any of the last transmission occasion's symbols) of the set. Determining the location of the last transmission occasion may comprise determining a location of an end symbol of the last transmission occasion according to: S+L*N−1. For example, if the location of the starting symbol (S) is four, the time domain duration (L) is four, and the number (N) of transmission occasions in a time slot (e.g., mini slots within a slot) is two, the location of the end symbol is 4+4*2−1=11. The TDRA table may provide/indicate/specify the values of S, L, and/or other information. In some embodiments, the location of (an end symbol of) the last transmission information may be represented by a different formula or function of S, L and/or N, f or example S+L*N. The wireless communication device may determine the time domain resource location according to the value of N and/or other information. In some embodiments, the last transmission occasion may be located in a last slot of the number of consecutive slots.

Referring now to operation (756), and in some embodiments, the wireless communication device may perform the set of one or more transmissions across the number of consecutive time slots. The wireless communication device may perform the transmissions according to the information of the last transmission occasion, the location of the last transmission occasion, and/or other information. In some embodiments, the last transmission occasion may occupy a time duration. The time duration may comprise a time duration that is shorter than or equal to that of each of other ones of the transmissions.

Figure 8:
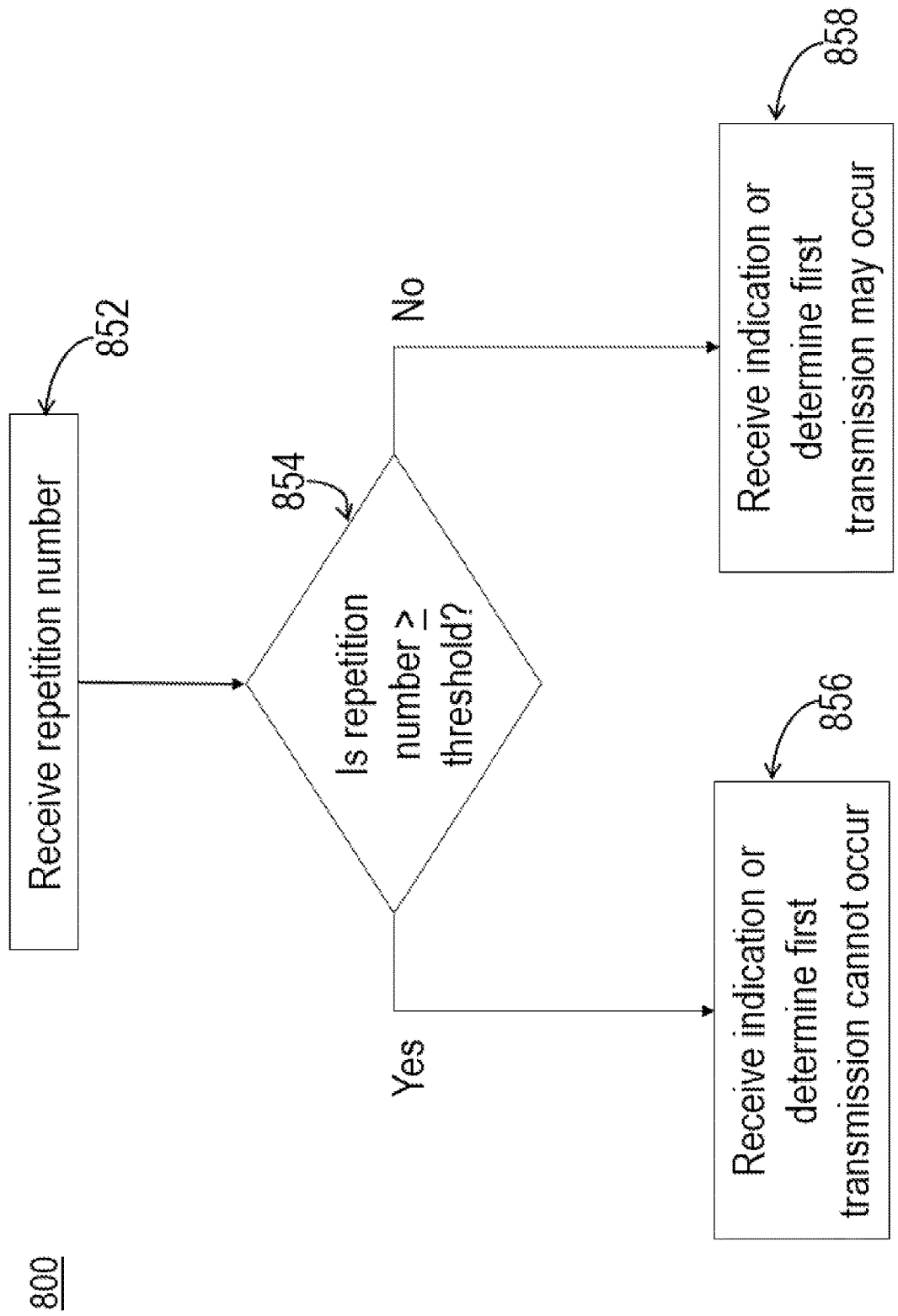

FIG. 8 illustrates a flow diagram of a method 800 for determining resource assignments. The method 800 may be implemented using any of the components and devices detailed herein in conjunction with FIGS. 1-6. In overview, the method 800 may include receiving a repetition number (852). The method 800 may include determining whether the repetition number is greater than or equal to a threshold (854). The method 800 may include receiving or determining that the first transmission cannot occur (856). The method 800 may include receiving or determining that the first transmission may occur (858).

Referring now to operation (852), and in some embodiments, a wireless communication device may receive/obtain a repetition number (or other information) from a wireless communication node. The wireless communication node may send/transmit/broadcast the repetition number (or other information) to the wireless communication device. In some embodiments, the wireless communication node may send/transmit the repetition number using high level signaling (e.g., repK signaling). For example, the wireless communication node may use repK signaling to specify/indicate the value of the repetition number. In some embodiments, the TDRA table may include/provide/specify the repetition number.

Referring now to operation (854), and in some embodiments, the wireless communication device may determine whether the repetition number is greater than or equal to a first threshold. In some embodiments, the wireless communication device may determine whether a number of resource configurations is greater than or equal to a second threshold. The first threshold and/or second threshold may have a value of an integer greater than or equal to 1. Responsive to the determination that the repetition number and/or the number of resource configurations meet or exceed their respective thresholds, the wireless communication node may send/transmit an indication to the wireless communication device. For example, if the repetition number is greater than or equal to eight (or other numbers), the wireless communication device may receive/obtain an indication from the wireless communication node. The wireless communication node may send the indication via RRC signaling, DCI signaling, and/or other signaling to the wireless communication device. The wireless communication device may receive/obtain the indication via RRC signaling, DCI signaling, and/or other signaling. In some embodiments, responsive to the determination, the wireless communication device may determine the occurrence of a first transmission.

Referring now to operations (856) and (858), and in some embodiments, the wireless communication device may receive an indication from the wireless communication node. The wireless communication node may send/transmit/broadcast the indication to the wireless communication device. The indication may comprise an indication that a first transmission of one or more transmissions may occur in a transmission occasion that is different from a last or P-th transmission occasion for the one or more transmissions. In some embodiments, the wireless communication device may determine that a first transmission of one or more transmissions may not occur in a last or P-th transmission occasion for the one or more transmissions. Therefore, the wireless communication device may be preconfigured to determine the occurrence of the first transmission. The wireless communication device may determine the occurrence of the first transmission responsive to a determination of a condition. In some embodiments, the wireless communication device may receive/obtain/access the indication responsive to a determination of a condition.

The condition may comprise that the repetition number is greater than or equal to a first threshold and/or the number of resource configurations is greater than or equal to a second threshold. For example, the repetition number and the number of resource configurations may both exceed the corresponding thresholds. Therefore, the wireless communication device may determine that the first transmission of one or more transmissions may not occur in a last or P-th transmission occasion for the one or more transmissions. In another example, the repetition number and the number of resource configurations may be less than the corresponding thresholds. Therefore, the wireless communication device may determine that the first transmission of one or more transmissions may occur in a last or P-th transmission occasion for the one or more transmissions. In some embodiments, P may correspond to an integer greater than or equal to 1. In some embodiments, each transmission occasion may define/determine/configure a time window for one of the one or more transmissions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   receiving, by a wireless communication device from a wireless communication node, information comprising a location of a starting symbol (S) and a time length (L) of a first transmission occasion for a set of one or more transmissions, a number of consecutive slots, and a number (N) of transmission occasions occurred in a time slot, each transmission occasion defining a time window as a portion of the time slot for one of the one or more transmissions;
   determining, by the wireless communication device, a location of a last transmission occasion of the set; and
   performing, by the wireless communication device, the set of one or more transmissions across the number of consecutive time slots according to the information and the location of the last transmission occasion.

2. The method of claim 1, wherein a plurality of transmission occasions is configured for the set of one or more transmissions, and the plurality of transmission occasions occur back-to-back within a period of time without any time gap between consecutive ones of the plurality of transmission occasions.

3. The method of claim 1, wherein determining the location of the last transmission occasion comprises determining a location of an end symbol of the last transmission occasion according to: S+L*N−1, wherein the last transmission occasion is located in a last slot of the number of consecutive slots.

4. The method of claim 1, wherein the last transmission occasion occupies a time duration that is shorter than or equal to that of each of other ones of the transmissions.

5. A wireless communication device, comprising:
   at least one processor configured to:
      receive, via a receiver from a wireless communication node, information comprising a location of a starting symbol (S) and a time length (L) of a first transmission occasion for a set of one or more transmissions, a number of consecutive slots, and a number (N) of transmission occasions occurred in a time slot, each transmission occasion defining a time window as a portion of the time slot for one of the one or more transmissions;
      determine a location of a last transmission occasion of the set; and
      perform the set of one or more transmissions across the number of consecutive time slots according to the information and the location of the last transmission occasion.

6. The wireless communication device of claim 5, wherein a plurality of transmission occasions is configured for the set of one or more transmissions, and the plurality of transmission occasions occur back-to-back within a period of time without any time gap between consecutive ones of the plurality of transmission occasions.

7. The wireless communication device of claim 5, wherein the at least one processor is configured to determine the location of the last transmission occasion, by determining a location of an end symbol of the last transmission occasion according to: S+L*N−1, wherein the last transmission occasion is located in a last slot of the number of consecutive slots.

8. The wireless communication device of claim 5, wherein the last transmission occasion occupies a time duration that is shorter than or equal to that of each of other ones of the transmissions.

9. A method, comprising:
   sending, by a wireless communication node to a wireless communication device, information comprising a location of a starting symbol (S) and a time length (L) of a first transmission occasion for a set of one or more transmissions, a number of consecutive slots, and a number (N) of transmission occasions occurred in a time slot, each transmission occasion defining a time window as a portion of the time slot for one of the one or more transmissions,
   wherein the wireless communication device determines a location of a last transmission occasion of the set, performs the set of one or more transmissions across the number of consecutive time slots according to the information and the location of the last transmission occasion.

10. The method of claim 9, wherein a plurality of transmission occasions is configured for the set of one or more transmissions, and the plurality of transmission occasions occur back-to-back within a period of time without any time gap between consecutive ones of the plurality of transmission occasions.

11. The method of claim 9, wherein wireless communication device determines the location of the last transmission occasion by determining a location of an end symbol of the last transmission occasion according to: S+L*N−1, wherein the last transmission occasion is located in a last slot of the number of consecutive slots.

12. The method of claim 9, wherein the last transmission occasion occupies a time duration that is shorter than or equal to that of each of other ones of the transmissions.

13. A wireless communication node, comprising:
   at least one processor configured to:
      send, via a transmitter to a wireless communication device, information comprising a location of a starting symbol (S) and a time length (L) of a first transmission occasion for a set of one or more transmissions, a number of consecutive slots, and a number (N) of transmission occasions occurred in a time slot, each transmission occasion defining a time window as a portion of the time slot for one of the one or more transmissions,
      wherein the wireless communication device determines a location of a last transmission occasion of the set, performs the set of one or more transmissions across the number of consecutive time slots according to the information and the location of the last transmission occasion.

14. The wireless communication node of claim 13, wherein a plurality of transmission occasions is configured for the set of one or more transmissions, and the plurality of transmission occasions occur back-to-back within a period of time without any time gap between consecutive ones of the plurality of transmission occasions.

15. The wireless communication node of claim 13, wherein the wireless communication device determines the location of the last transmission occasion by determining a location of an end symbol of the last transmission occasion according to: $S+L*N-1$, wherein the last transmission occasion is located in a last slot of the number of consecutive slots.

16. The wireless communication node of claim 13, wherein the last transmission occasion occupies a time duration that is shorter than or equal to that of each of other ones of the transmissions.

\* \* \* \* \*